UNITED STATES PATENT OFFICE.

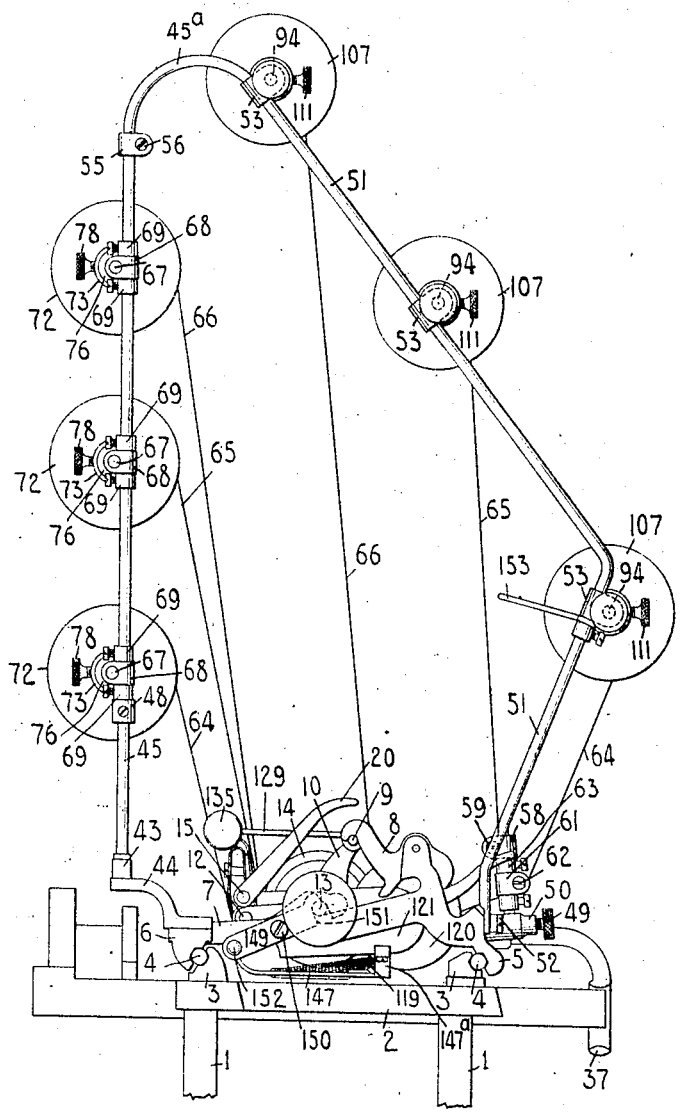

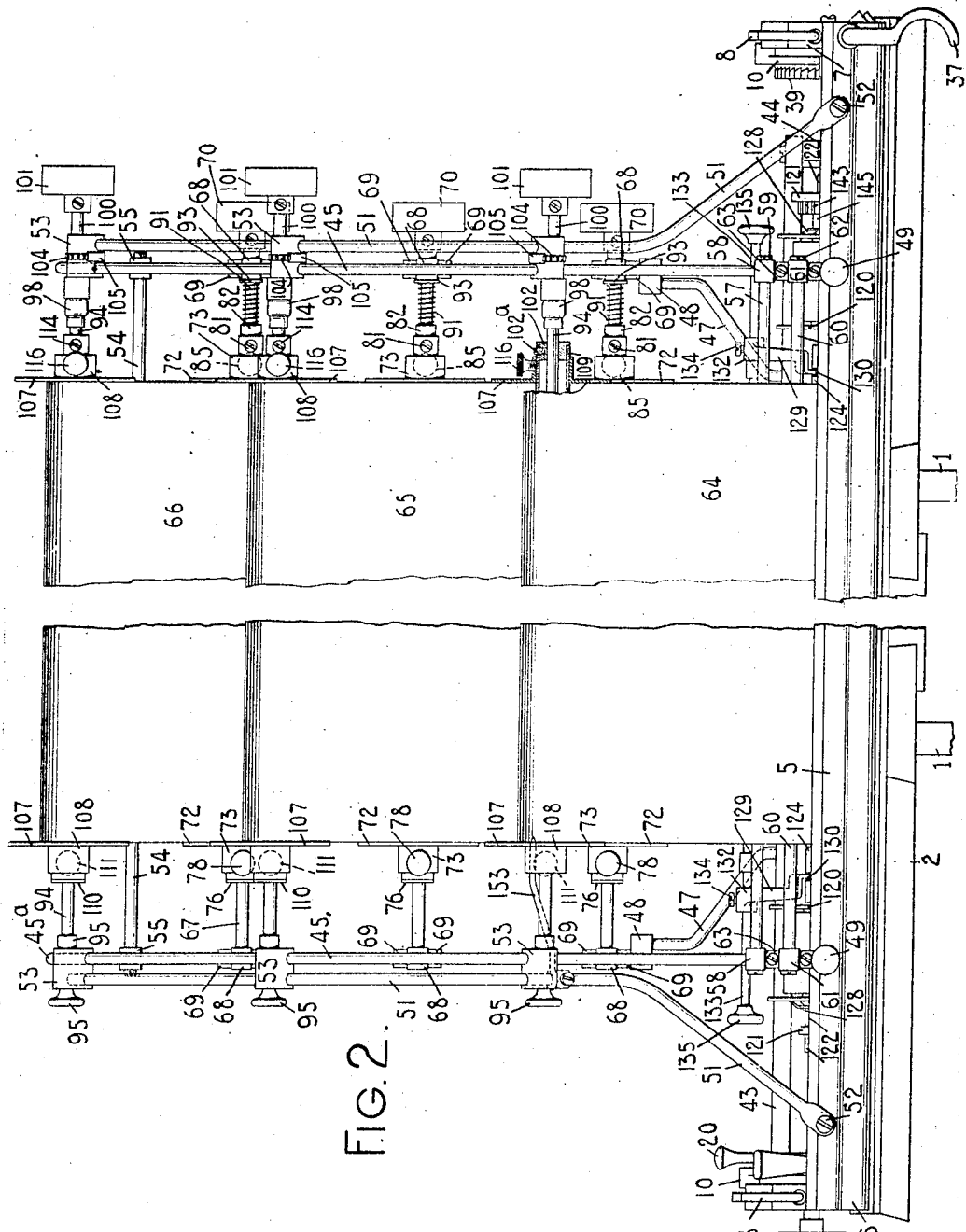

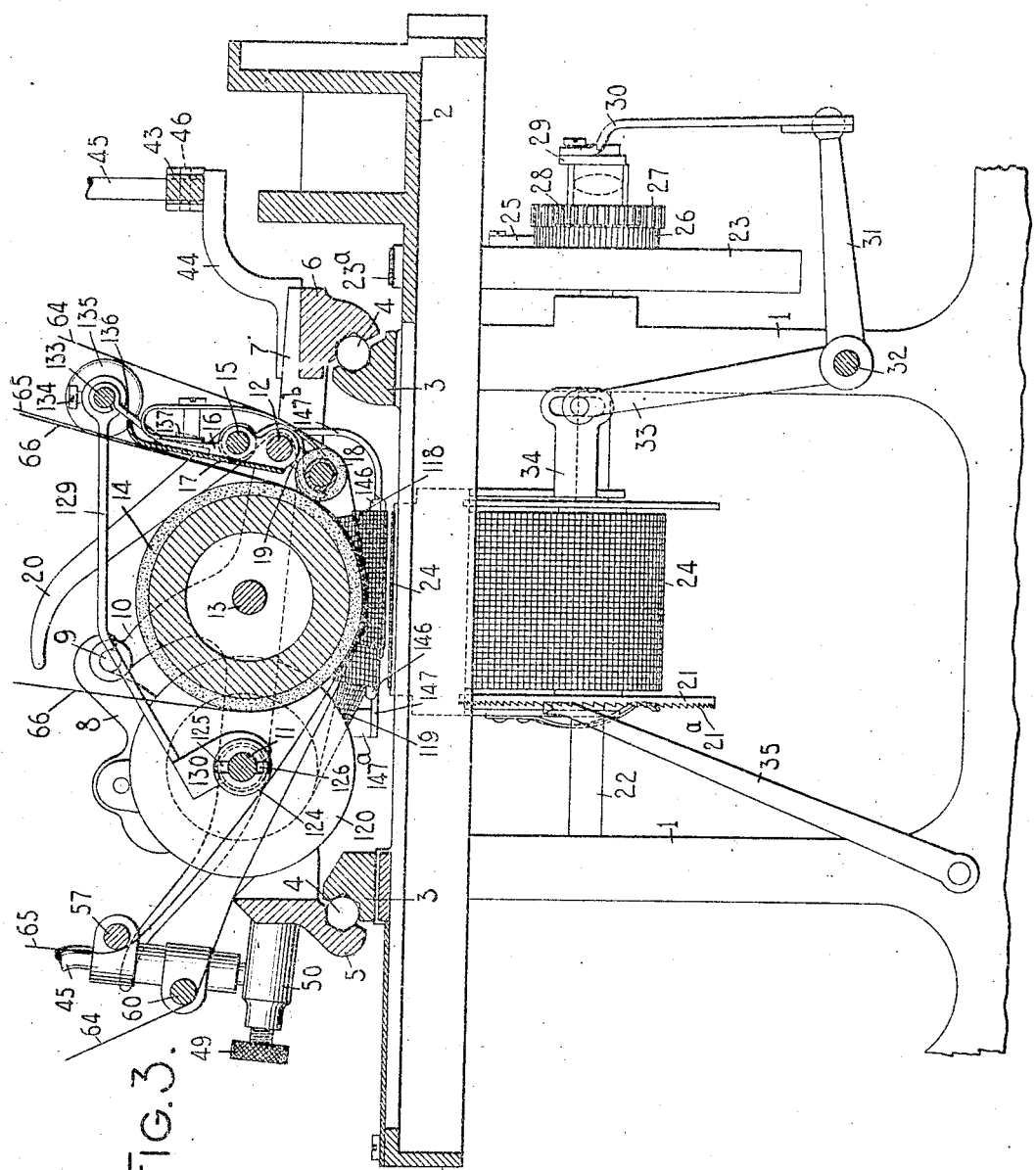

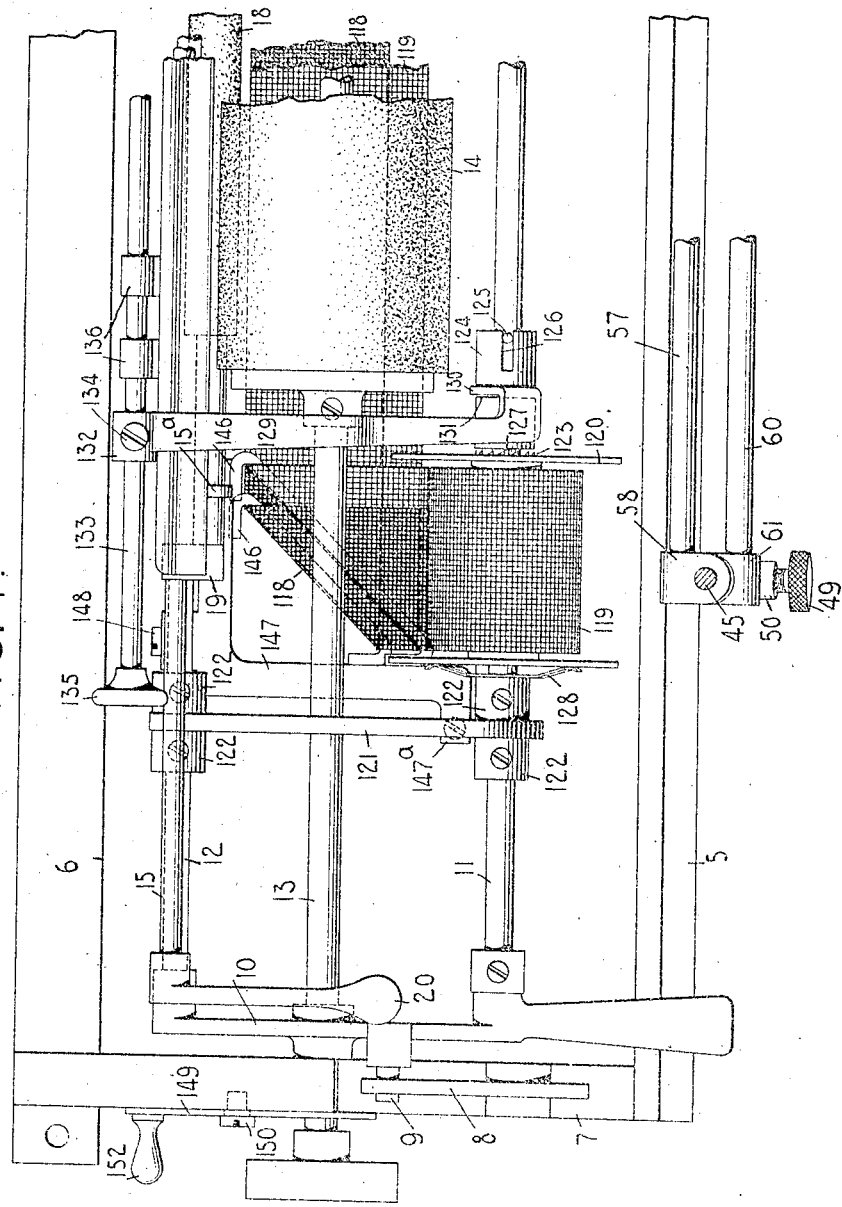

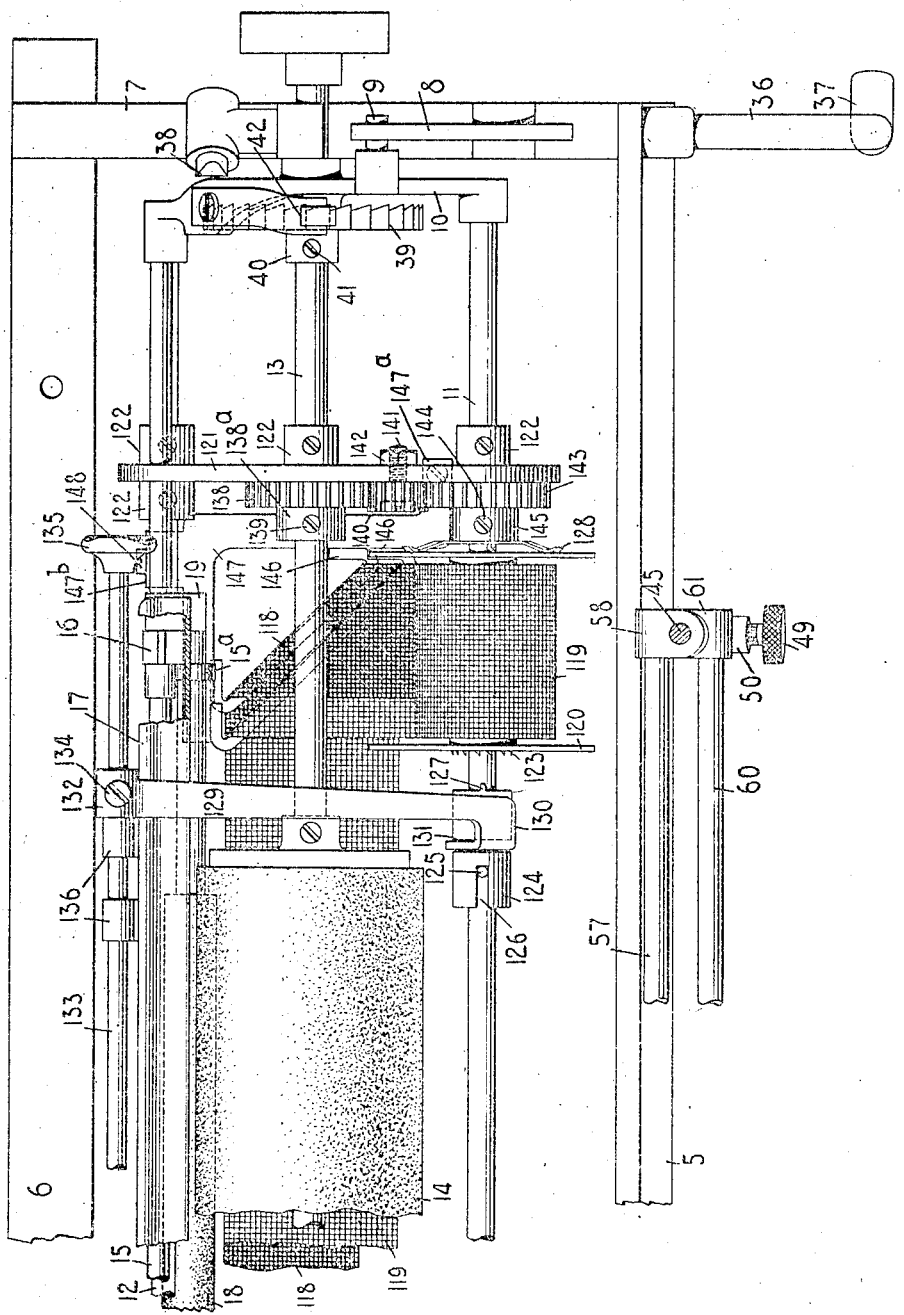

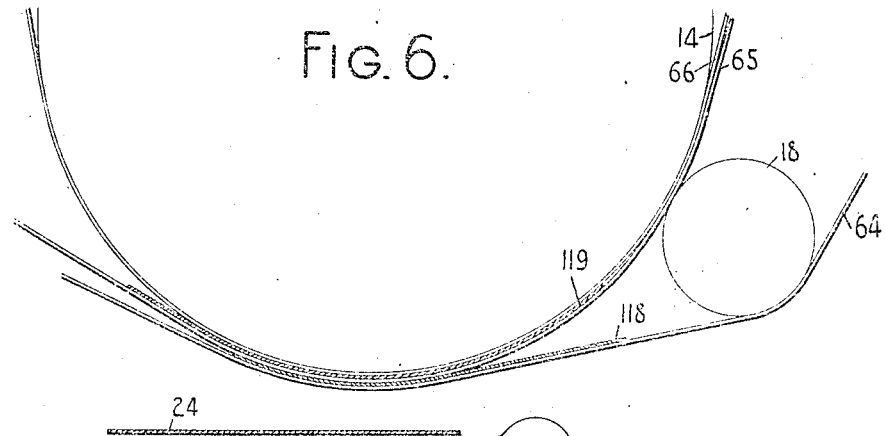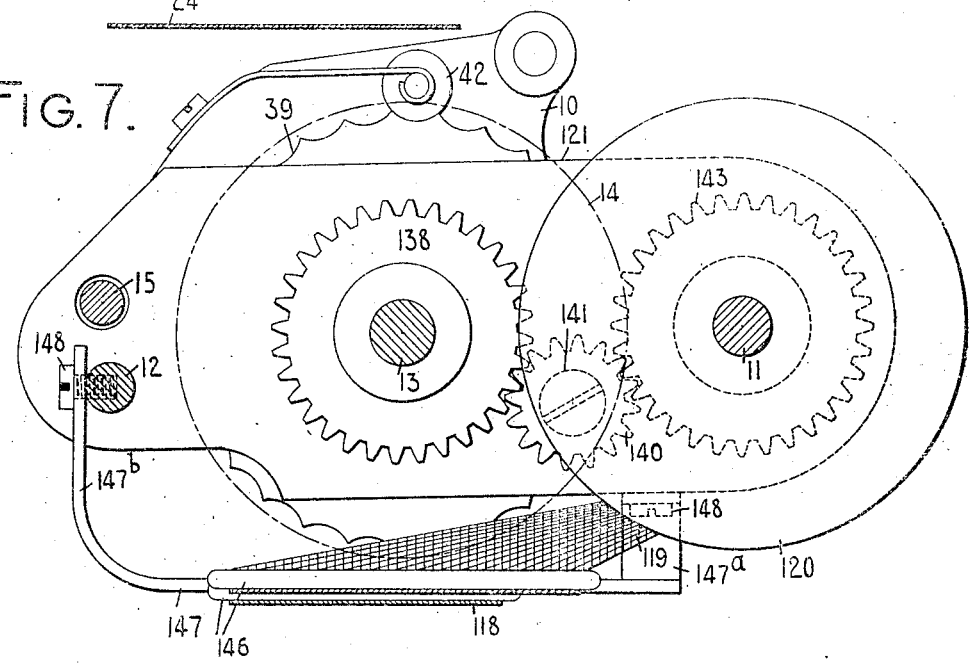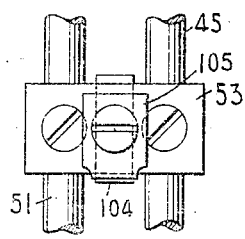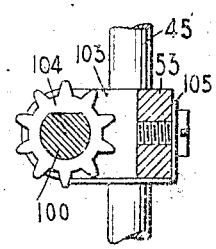

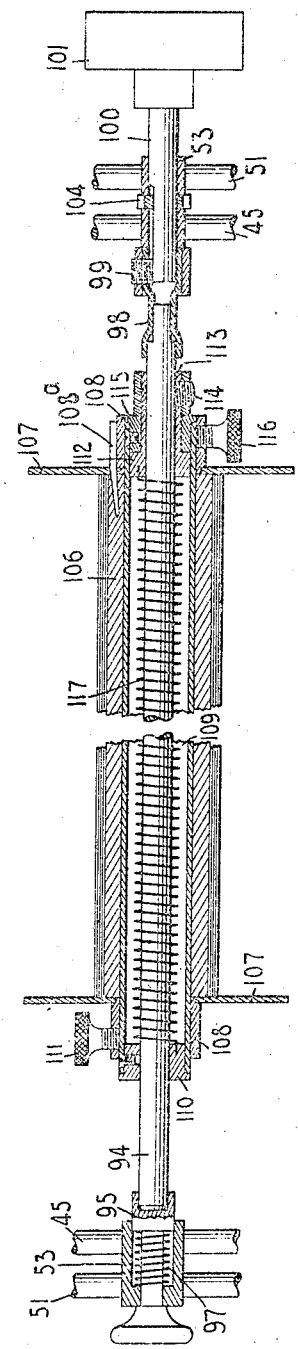
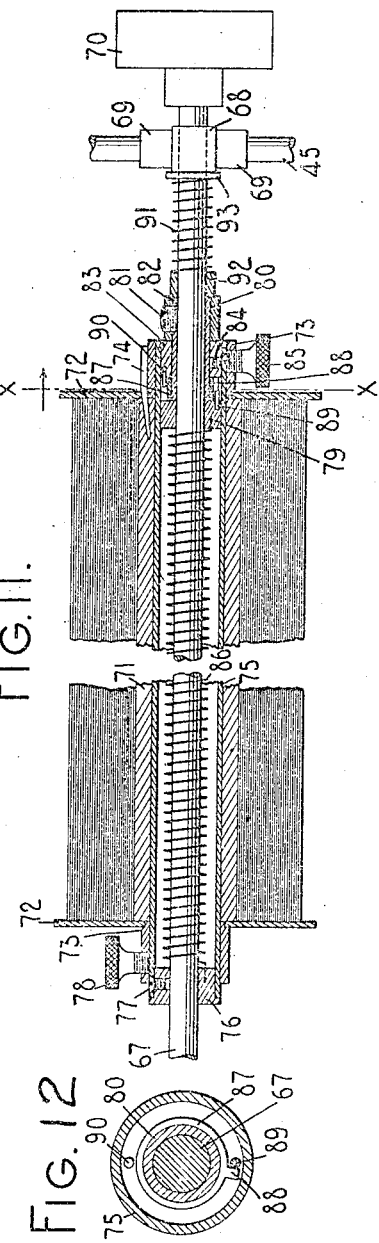
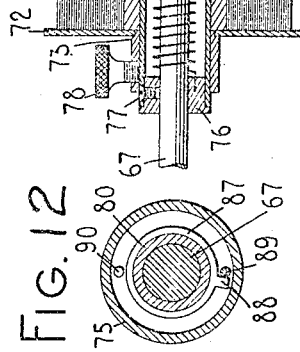

ROBERT R. KING, OF NEW YORK, N. Y., AND GEORGE T. PRICE, OF WEST ORANGE, NEW JERSEY, ASSIGNORS TO THE SMITH PREMIER TYPEWRITER COMPANY, OF SYRACUSE, NEW YORK, A CORPORATION OF NEW YORK.

TYPE-WRITING MACHINE.

1,035,197.  Specification of Letters Patent.  Patented Aug. 13, 1912.

Application filed October 23, 1909.  Serial No. 524,189.

*To all whom it may concern:*

Be it known that we, ROBERT R. KING and GEORGE T. PRICE, citizens of the United States, and residents, respectively, of the borough of Brooklyn, county of Kings, city of New York, and State of New York, and of West Orange, county of Essex, and State of New Jersey, have invented certain new and useful Improvements in Type-Writing Machines, of which the following is a specification.

Our invention relates especially to mechanism for producing a plurality of inked or original typewritten copies and its object, generally stated, is to provide improved devices of this character.

To the above and other ends, our invention consists in the features of construction, arrangements of parts and combinations of devices to be hereinafter described and particularly pointed out in the claims.

The embodiment of our invention herein disclosed was particularly designed for waybilling purposes but it will be understood that the principles of said invention may be made use of for producing other kinds of typewritten work besides way-bills.

In carrying out our invention in the present instance, we have provided a support or framework which is mounted on the carriage truck, said framework comprising two side elements detachably secured to the carriage truck beyond the ends of the platen and connected together by parallel cross rods. The framework supports shafts for the delivery and receiving web or roll holders or carriers. There are three delivery roll carriers in the present instance, one mounted above the other at the rear of the platen and each provided with a spring tension device adapted to keep the paper taut between the rolls and the platen at the delivery side. The ends of the paper from the two upper rolls or webs are led down to the platen over the usual paper table and fed between the regular feed rolls. The paper from the lowermost delivery roll is guided around the platen behind the paper table and outside of the feed rolls and of the other paper feeding devices and is received at the front of the machine by a roll holder which is adapted to be turned by hand for line spacing purposes. The turning of the platen, it will be understood, does not affect the sheet last referred to which is the outermost sheet and is the way-bill proper. The turning of the platen does, however, operate to advance the two inner sheets which are controlled by the usual feed rolls and paper feeding devices and are received at the front of the machine on two roll carriers or holders arranged on the supporting frame above the receiving roll for the outermost sheet. These two receiving roll holders are each provided with a spring device for turning the rolls and winding the associate written sheet thereon. Interleaved with the three sheets at the under side if the platen are two auxiliary ribbons, these ribbons extending lengthwise of the platen and beneath the same, one of said ribbons being directly over the other. The auxiliary ribbons are supported on two spools carried by a shaft parallel with and at the front of the platen, said shaft being geared to the platen shaft so that when the platen is turned the shaft will be turned to feed the ribbon, one only of said spools being connected at a time by a clutch device to the supporting shaft. The clutch connections between said supporting shaft and the spools are operated by a slide rod at the back of the platen. The usual inking ribbon of the machine is employed to give the impressions on the way-bill proper while the two auxiliary ribbons each ink one of the inner sheets when the type bars are operated.

It will be seen that our invention provides for making three original copies of the waybill. The items on the two inner sheets are condensed and these inner sheets are severed at intervals and filed away in books for reference purposes, one of these books being kept at the despatching office while the other is forwarded to the main office of the company. Each way-bill proper contains only a single entry or line, and, of course, after being written, the way-bills are separated and despatched along with the parcels to which they relate.

Our invention will be more particularly explained in connection with the accompanying drawings, wherein—

Figure 1 is an end elevation showing the upper part of a typewriting machine with our invention applied thereto. Fig. 2 is a fragmentary front elevation of the upper part of the machine. Fig. 3 is a fragmentary transverse sectional view of the carriage and parts of our invention mounted thereon, part of the typewriting machine below the carriage and supporting the usual ribbon mechanism also being shown. Figs. 4 and 5 are fragmentary plan views partly in section showing opposite end portions of the carriage. Fig. 6 is a diagrammatic view showing the relationship between the work sheets and the ribbons at the printing side of the platen. Fig. 7 is a transverse vertical sectional view showing the ribbon feeding mechanism of the auxiliary ribbons. Figs. 8 and 9 are respectively a fragmentary rear elevation and a corresponding transverse sectional view of detent devices associated with each of the receiving roll holders. Fig. 10 is a longitudinal vertical sectional view of one of the receiving roll holders. Fig. 11 is a longitudinal vertical sectional view of one of the delivery roll holders. Fig. 12 is a transverse sectional view taken on a plane represented by the dotted line x—x in Fig. 11 and looking in the direction of the arrows at said line.

The invention is shown as applied to an understrike Smith Premier typewriting machine of the wide platen style but it is to be understood that it may be adapted in whole or in part to other styles of writing machines.

The main frame of the machine comprises an under part 1 supporting a top plate 2 on which is secured grooved track-ways 3 coöperating with anti-friction balls 4 which also coöperate with the front and rear bars, numbered respectively 5 and 6, of the carriage truck, said carriage truck further comprising end bars 7. Latches 8 on the truck engage studs 9 on the end bars 10 of a platen frame or carrier which also comprises a front bar 11 and a parallel rear bar 12, the front bar being free to turn and not fixed as usual. The platen frame and the truck are pivotally and detachably connected and together compose the carriage of the machine. The platen frame carries an axle 13 which bears on the end bars 7 of the truck and carries a platen 14. By reference more especially to Figs. 4 and 5, it will be seen that the ends of the platen terminate some distance from the ends of the platen frame so that at each end considerable space is left between the platen and the ends of the platen frame. Supported on the platen frame at the rear is a shaft 15 which, together with the bar 12, provides a support for standards 16 for the usual paper table 17. A main feed roller 18 carried by links 19 coöperates with the platen at its rear side below the paper table. The rock shaft 15 is provided with devices 15ª of the usual sort for releasing the feed roller 18, said rock shaft being controlled by a finger piece 20 secured to its left-hand end.

Ribbon spools 21 (Fig. 3) of ordinary pattern are arranged one at each side of the machine below the top plate, said ribbon spools being mounted on shafts 22 carried by the frame 1 and being connected with said shafts so as to be rotatable thereby, the connection permitting slidable movement of said spools lengthwise of their shafts. Rotary motion is communicated to the shafts 22 from the usual spring drum 23 which controls the carriage through a strap 23ª. A main ribbon 24 passes over the top plate and down through openings therein to the spools 21 on which it is wound. The spring drum is connected by a pawl 25 and a coöperating ratchet wheel 26 with a gear 27 which meshes with a second gear 28, said gear 28 being connected with a crank arm 29 which in turn is connected by a link 30 with a crank arm 31 fixed to a rock shaft 32, said rock shaft being supported at its ends on the frame 1. Rising from the rock shaft adjacent to each spool 21 is a crank arm 33 which has a pin and slot connection with a spool frame or carrier 34. It will be understood that the rock shaft 32 is rocked from the spring drum and thereby communicates back and forth movements to the ribbon spools along their shafts 22, thus giving a cross feed to the ribbon 24. Lengthwise feed is communicated to the ribbon by devices comprising ratchet teeth 21ª formed on the front flange of each ribbon spool, said ratchet teeth coöperating with pawl arms 35. The pawl arms are adapted to engage alternately with the associate ratchet teeth 21ª.

Line spacing devices are provided comprising a rock shaft 36 Fig. 5 supported on the carriage truck and provided at its front end with a depending handle or finger piece 37 and at its rear end with the bearing for a pawl 38. The pawl is adapted to coöperate with a ratchet wheel 39 supported on the platen axle 13 and having a hub 40 which receives a set screw 41 whereby the ratchet wheel is fixed to the shaft 13. A spring mounted roller detent 42 coöperates with the ratchet wheel to hold the platen in adjusted positions.

It will be understood that the machine is provided with the usual printing instrumentalities (not shown). Further it will be understood that while the devices thus far referred to have not been described in great detail, they are or may be the same as are ordinarily found in the machine with the exception that the platen is shortened and the line spacing wheel 39 is separated therefrom.

The machine is preferably equipped with tabulating mechanism for the reason that the outermost work sheet in the present instance is printed in columns and is intended to be used with a tabulator. Any tabulator may be used, preferably that commonly employed with the Smith Premier typewriter. Said tabulating mechanism comprises a tabulator stop bar 43 which carries adjustable column stops (not shown) and which is mounted on curved arms or brackets 44 detachably secured to the rear bar 6 of the truck.

Our improvements comprise a supporting frame for the rolls of paper, said supporting frame being mounted on the carriage and comprising side members 45 which are preferably formed of round stock or heavy wire and bent to the shape shown in Fig. 1. The manner of securing these side members in place on the carriage is illustrated in Figs. 1, 2 and 3. At the rear, the lower end of each side member engages in a vertical hole in the tabulator bar 43 and is secured therein by a cross pin 46. Angularly disposed and extending laterally inward from the rear of each side member is a brace 47 which is secured at its upper end in a block 48, said block being fixed to its associate side member by a screw or otherwise. The lower end of each brace engages in a hole in the tabulator bar 43. The construction is such that each side member is rigidly held against sidewise vibration at the rear. The front lower end of each side member 45 is detachably secured by a thumb screw 49 in a block 50 which is suitably fixed to and projects forward from the front bar 5 of the truck. A front brace or supporting element 51 coöperates with each side member to stiffen it and minimize vibration and also assists to support certain bearing blocks presently to be described. Each brace 51 is flattened at its lower end and secured by a screw 52 to the front bar 5 at a point some distance outward beyond the adjacent block 50. From the point of attachment at 52 each front brace 51 inclines inward and upward until quite close to the associate side member after which the brace 51 extends upward and parallel with said side member close to the top bend 45ª thereof. Each side member and its associate brace are connected by blocks 53, three of such blocks being shown. The blocks 53 are each screwed or otherwise secured both to the associate side member 45 and the brace 51. To further promote the rigidity of the supporting frame the two side members 45 are connected by cross rods or bars. One of these cross rods 54 extends from one side member to the other at the rear of and just below the top bends 45ª, said cross rod 54 being supported in blocks 55 which are screwed or otherwise secured to the side members. Screws 56 engage in tapped holes in the ends of the cross rod 54 and are screwed in until their heads abut against the outer faces of the blocks 55. It will be understood that the screwing in of these screws 56 tends to draw the side members closer together and promote rigidity. At the front the two side members are connected near their lower ends by a cross rod 57 supported in blocks 58 suitably secured to the side members 45. The blocks 58 project rearward and the rod 57 is behind the front part of the side members. The rod 57 is associated with screws 59 which when tightened tend to draw the side members toward each other. Below and parallel with the rod 57 and forward of the side members 45 is a rod 60 supported on blocks 61. Screws 62 coöperate with the ends of said rod 60 to maintain it in proper relationship with the blocks 61. These blocks are supported on the side members 45 and are held from up and down movement thereon by a screw collar 63. The rods 57 and 60 serve as guides for certain of the work sheets as will be hereinafter described.

The rear parts of the side members 45 below the bends 45ª are substantially upright and serve to support three work sheets 64, 65 and 66 in the form of webs or rolls which are carried on roll holders or carriers arranged one above the other on the upright portions of the members 45. These delivery roll holders are substantially alike and the same construction is employed for supporting each of them. Referring especially to Figs. 1, 2, 11 and 12, each delivery roll holder is supported on a shaft 67 which is mounted near its ends in bearing blocks 68, said blocks being loose on the side members 45 but being held from up and down movement thereon by screw collars 69. The right-hand end of the shaft 67 projects outward beyond the adjacent bearing block and has fixed to it a finger wheel 70 like an ordinary platen finger wheel in construction. Each shaft 67 carries a delivery roll holder or carrier which, as shown in Fig. 11, comprises an outer core 71 with which are associated flanges 72 having projecting collar portions 73. Each collar 73 is suitably connected to its flange, and at each end of the core piece 71 a flange 72 with its collar 73 are detachably secured to a supporting element as presently described. A pin 74 is fixed to one of the flanges and projects inward to engage in an opening in the core so that the latter is forced to turn with the flange. The flanges abut against the ends of the core and maintain the rolled work sheet in proper position thereon. The flanges and core fit over and are carried by an inner tubular support or sleeves 75 which at its left-hand end has fixed in it a bushing or bearing block 76 by a screw 77, the bearing block 76 bearing on the shaft 67. A thumb screw 78 passes through the left-hand collar 73 and secures the left-hand flange 72 fixedly to the sleeve 75. Arranged within the right-hand end of the sleeve 75 is a collar 79 having an elongated hub 80 which projects outwardly beyond the spool and is secured to the shaft 67 by means of a set screw 81 and a collar 82, the collar 82 providing stock for the hole for the set screw 81. The collar 79 provides a bearing for a bushing or block 83 which is secured in the right-hand end of the sleeve 75 by a set screw 84. A thumb screw 85 passes through the right-hand collar portion 73 and abuts against the sleeve 75, securing the associate flange to the sleeve. The core 71 and sleeve 75 are frictionally connected but in addition the pin 74 provides a positive connection, forcing the parts to turn together. The core is held from endwise motion by the flanges 72. Surrounding the shaft 67 within the sleeve 75 is a coiled spring 86, the left-hand end of said spring being secured in the bushing 76 and its right-hand end being secured in the collar 79. It will be noted that in effect the spring at its left-hand end is connected through the sleeve 75 to the roll holder while at its right-hand end said spring is connected to the shaft 67. Between the collar 79 and the bushing 83 is a short sleeve 87 which bears loosely on the hub 80. Said sleeve, as best appears in Fig. 12, is provided with a projecting lip or lug 88 which is adapted to coöperate with a lateral pin 89 on the collar 79 and also with a lateral pin 90 on the bushing 83. The construction is such that the spring 86 tends to maintain the pin 90 in contact with opposite faces of the lug 88. When the paper carried by the roll holder is unwound and the roll holder caused to rotate, the rotation is resisted by the spring 86. By reason of the lost motion connection comprising the pins 89 and 90 and the lug 88 the roll holder is, however, permitted to turn through near two complete revolutions, thereby winding up the spring 86. The spring 86 yieldingly connects the shaft 67 with the roll holder and permits a sufficient relative turning movement between them to take up any slack in the paper between the roll holder and the platen. This spring tension device is not claimed *per se* by us, it being the invention of H. C. Ford as disclosed in his Patent No. 993,234, granted May 23rd, 1911. Reference may be had to said application for fuller explanation of this feature. Surrounding each shaft 67 between its right-hand end bearing block 68 and the hub 80 is a coiled spring 91. The ends of said spring abut against washers 92 and 93 which in turn abut respectively against the hub 80 and the bearing block 68. The spring 91 tends to press the shaft 67 longitudinally left-ward and to maintain its left-hand end portion engaged in the associate left-hand bearing block 68. The spring 91 may be pressed by pulling rightward on the finger wheel 70, thereby disengaging the shaft 67 from its left-hand bearing block and enabling it, together with the roll holder carried by it, to be swung rearward, the right-hand bearing block turning about the upright portion of the right-hand side member 45 as a center to permit of this operation. When the roll holder is thus swung rearward with the shaft, the thumb screws 78 may be loosened, permitting the core piece to be removed and replaced by one containing a fresh roll.

As clearly appears in Fig. 1 the delivery roll holders are arranged behind the platen and one directly above the other. In preparing the roll holders for use in the machine, the inner ends of the work sheets are secured by clips or otherwise to the core pieces, the sheets then being wound into rolls or webs. The loose or outer ends of the rolled sheets 64, 65 and 66 are drawn forward over the tops of the rolls and led downward and slightly forward toward the platen. The free portions of the rolls or sheets 65 and 66 are guided in front of and over the paper table and between the platen and the main feed roller and such other paper feeding devices as may be employed in coöperation with the platen, passing under and around the platen and upward at the forward side thereof. The outer sheet 64 passes down behind the paper table and outside of the main feed roller and other paper feeding devices so that the turning of the platen does not affect the sheet 64 while it does advance both the other sheets and turns the rolls from which said other sheets are drawn. The way in which the sheets are guided around the platen and their relationship therewith are illustrated clearly in Fig. 3. The innermost work sheet 66 is led upward from the front of the platen and slightly rearward, being received on a roll holder which is arranged almost at the top of the supporting frame just forward of the bends 45ª. It will be noted that forward of the bends the side members incline forward and downward. Midway of the length of these inclined portions is arranged the receiving roll holder for the middle sheet 65. The sheet 65 is guided forward after passing the printing point on the platen and is drawn over the cross rod 57 which serves as a guide for said sheet, the latter thence passing upward to its receiving roll holder. The outer sheet 64 is guided from the platen over the cross rod 60, said rod serving as a guide therefor. From said cross rod the sheet 64 passes upward and somewhat forward to its receiving roll holder which is arranged just below the bends in the forward portions of the side supporting frame. The disposition of the various delivery and receiving roll holders or carriers is such that while they are separated far enough to enable them to be independently manipulated with facility, they are, nevertheless, comparatively close together and so disposed that the weight of the contrivance comprising the rolls and their supporting frame is substantially evenly distributed above the carriage with relation to the bearings thereof.

The three receiving roll holders and carriers are, with an exception hereinafter noted, substantially alike and the method of mounting them is the same so that the description of one, in connection chiefly with Fig. 10, will apply to all. Each receiving roll holder is supported on a shaft 94. At its left-hand end said shaft bears in a depression in the head of a spring plunger 95 which in addition to the head further comprises a stem and finger piece, said plunger bearing in one of the left-hand blocks 53. Surrounding the stem of the plunger 95 within the bearing block is a coiled spring 97 which tends to press the plunger 95 inward and maintain it engaged with the end of the shaft 94. By pulling outward the finger piece of the plunger the latter may be disengaged from the shaft to facilitate removal of the latter. The right-hand end portion of each shaft 94 is flattened at opposite sides and fits into a corresponding opening in a collar or socket piece 98, said collar being secured by a set screw 99 to a short shaft 100, the set screw coöperating with a flattened face on said shaft. The outer end of said shaft carries a finger wheel 101. The shaft 100 bears in one of the right-hand blocks 53. The construction is such that when the shaft 100 is turned by the finger wheel 101, motion is transmitted through the socket piece 98 to the shaft 94. When, however, the spring plunger 95 is retracted to free the left-hand end of the shaft 94 the flattened right-hand end thereof may readily be withdrawn from the socket piece.

Referring to Figs. 2, 8, 9 and 10 it will be seen that each of the right-hand bearing blocks 53 is provided with a vertical slot or kerf 103 which receives a toothed wheel 104, said wheel being driven on or otherwise suitably secured to the shaft 100. A spring detent finger 105 is secured to the bearing block and the free end of said finger coöperates with the teeth of the wheel 104 to hold the shaft 100 and through it the shaft 94 in adjusted positions.

Each shaft 94 carries a receiving roll holder which comprises a core piece 106 with which coöperate flanges 107 having projecting collar portions 108, the core being connected to turn with one of the flanges by a pin 108ᵃ, as in the case of the delivery roll holders previously described. The core 106 and associate flanges fit over a sleeve or inner core 109, the flanges abutting the ends of the core 106. In the case of the upper two receiving rolls, each core 109 has a bushing or plug 110 fixed to its left-hand end and bearing on the shaft 94. A thumb screw 111 secures the left-hand flange to the sleeve 109. At the right-hand end portion of each of the upper two sleeves 109 a collar 112 fits within the sleeve, said collar having an elongated outwardly extending hub 113 secured by a set screw 114 to the shaft 94. A bushing 115 bears loosely on the hub 113 and fits in the end of the sleeve 109, being suitably secured thereto. A thumb screw 116 detachably secures the right-hand flange 107 to the sleeve 109. Within each of the upper two tubes or sleeves 109 a coiled spring 117 is arranged surrounding the associate shaft 94, the left end of said spring being secured to the bushing 110 and the right end to the collar 112. It will be understood that the left-hand end of said spring is in effect fast to the roll holder while the right-hand end is secured to the shaft 94. The spring tends constantly to turn the roll holder and wind the paper thereon between the flanges 107, the paper being led up at the front of the core and over the top thereof and its loose end being secured by clips or in any other suitable manner to the roll holder.

The lowermost inner tube or sleeve 109 which is associated with the roll holder for the work sheet 64 is mounted somewhat differently from the upper two tubes as will be understood from Fig. 2. Each end of the lowermost tube 109 is closed by a plug or bearing block 102 which is secured in place by a set screw 102ᵃ, said set screw abutting against the shaft 94 and thereby securing the tube 109 in fixed relationship with said shaft. The thumb screws 111 and 116 are provided for the hubs of the flanges 107 of the lowermost receiving roll as in the case of the other two receiving rolls. No spring corresponding to the springs 117 is employed in the case of the lowermost receiving roll, said roll being rotatable by hand only.

It will be understood that the detent 104 associated with the lowermost receiving roll operates constantly to prevent backward rotation thereof which might otherwise occur owing to the force exerted by the spring 86 of the associate delivery roll. The tension of this spring 86 serves to maintain the work sheet 64 taut between its delivery and receiving rolls in a smooth condition where said work sheet passes over the platen. It will further be understood that the springs 117 in the upper two receiving roll holders tend both to rotate the roll holders to keep the paper taut at the delivery side of the platen between said holders and the main feed roller and also to rotate the supporting shafts, but motion of the shafts is prevented by the associate detents 104. The springs 117 can be wound up initially to a sufficient extent to wind a considerable portion of the work sheets on the receiving roll holders during the operation of the mechanism without further attention. In practice, however, it is advisable from time to time to impart additional tension to the springs 117 by turning the associate finger wheels 101.

When an item is printed it is preferred that it shall be reproduced in ink on each of the three work sheets so as to secure three original or inked copies. In order to obtain this result we provide three separate inking elements or ribbons, one of which is the ordinary or usual ribbon 24, the other two being supplementary or auxiliary ribbons 118 and 119 which are suitably supported on the carriage and are adapted to be fed when the platen is turned, as now to be described, reference being had more especially to Figs. 1 to 7 inclusive. The auxiliary ribbons are wound on auxiliary spools 120 which are mounted on the front bar or rod 11 of the platen frame. This front bar, instead of being fixed as is ordinarily the case, is, as heretofore stated, free to turn in the end bars 10 of the platen frame; and is in effect a shaft. Additional bearings are provided for said rod or shaft 11 by two plates 121 which are arranged one near each end of the platen frame and parallel to the end bars thereof. The plates 121 are perforated so that the bars 11 and 12 on the axle 13 may pass therethrough. Motion of said plates endwise of said axle and said rods is prevented by collars 122. The spools 120 are loosely mounted on the rod or shaft 11 so that they may be turned freely thereon, said spools being further capable of a slight endwise movement along the supporting shaft, the construction in this respect resembling that found in some styles of the Smith Premier typewriting machine. The spools 120 are adapted to be alternately connected with the shaft 11 by means which include ratchet teeth 123 projecting inward toward each other from the inner flange of each spool. Coöperative with each ratchet 123 is a clutch member in the form of a sleeve 124 having a pin and slot connection 125, 126 with the shaft 11, said connection permitting independent movement of the sleeve endwise of the shaft, but causing said sleeve always to turn with said shaft. The inner face of each sleeve opposite the adjacent ratchet teeth 123 is provided with one or more teeth 127 which coöperate with the ratchet 123 to connect the sleeve 124 and shaft 11 with the spool carrying said ratchet teeth. At the opposite side of each spool 120 from the ratchet 123 a three-armed leaf spring 128 is mounted on the shaft 11 and adapted to coöperate with the spool to provide a yielding backing therefor when the clutch member or sleeve 124 is slid along the shaft 11 into engagement with the ratchet 123. Means are provided for moving the two clutch members or sleeves simultaneously, one being brought into coöperation with one of the spools while the other is moved away from the other spool. The moving means comprise two arms 129, said arms being horizontally disposed and each having a downwardly and forwardly inclined front portion which terminates in a fork or finger 130 which engages in a depression or groove 131 in the sleeve 124. At their rear ends said arms 129 terminate in collar portions 132 which are perforated to receive a slide rod 133, being secured to said slide rod by screws 134. The slide rod is provided at the left with a finger button 135. Said rod is mounted in bearing brackets 136 which are secured at the rear of the paper table 17 by screws 137. It will be understood that when the parts are in the relationships shown in Figs. 4 and 5, the left-hand spool 120 is connected with the rod or shaft 11 while the right-hand spool is not connected to turn with the shaft. Further it will be clear that if the rod 133 is pushed toward the right the left-hand spool 120 will be disconnected while the right-hand spool will be connected with the shaft 11. The friction between the rod 133 and its bearings is sufficient to hold said rod in adjusted positions.

The shaft 11 is connected with the platen axle 13 so as to receive motion therefrom by a train of gearing which comprises a gear wheel 138, fixed to the platen axle by a screw 139 which abuts against the axle and is secured in a hub or collar 138ª fast on the gear wheel 138. Meshing with the latter is a pinion 140 which is supported on a shouldered screw 141, said screw being locked to the right-hand plate 121 by a nut 142. At the opposite side of the pinion 140 from the gear wheel 138, said pinion meshes with a gear wheel 143 mounted on and secured to the shaft 11 by a set screw 144 which engages in a hub or collar 145 on the gear wheel 143. It will be noted from a comparison of Figs. 4 and 5 that two of the collars 122 are dispensed with at the right-hand side, their functions of assisting to prevent movement of the right-hand plate 121 being subserved by the gear wheels 138 and 143. It will be understood that when the platen and platen axle are turned, turning motion in the same direction is communicated to the shaft 11 through the train of gearing just described, and this motion of the shaft is communicated to the one or the other of the spools 120 so as to turn said spool and wind the ribbons 118 and 119 thereon, said ribbons being at the same time unwound from the other or disconnected ribbon spool.

The auxiliary ribbons 118 and 119 are wound together on the spools 120 so that a single pair of spools serves for the two ribbons. It will be noted that the auxiliary spools 120 are arranged forward of the platen, one at each side thereof and in planes transverse of the platen. The auxiliary ribbons are led off the spools 120 from the front and under sides of said spools toward the rear and somewhat downward to planes slightly below the printing face of the platen. Thence the direction of the auxiliary ribbons is changed and they are turned at right angles and directed under the platen at its printing side and in superposed relationship with each other, the ribbon 118 being undermost. The guiding means for accomplishing this result comprise turning bars or wires 146 arranged in pairs, one pair at the rear of and below each spool, the two turning bars of each pair being parallel and a short distance apart, the inner turning bar of each pair cooperating with the ribbon 119 and the outer of each pair with the ribbon 118. Each pair of guide wires or turning bars 146 are soldered or otherwise secured to a horizontally disposed supporting frame 147. The frames 147 are each substantially L-shaped and are provided with upstanding off-set portions 147ª and 147ᵇ, one of which is contiguous to the rear bar 12 of the platen frame and the other to one of the side plates 121. Screws 148 pass through the off-set portions and secure the frames 147 to the rear bar 12 and side plates 121.

It will be understood more especially from Figs. 3 and 6 that the auxiliary ribbons underlie the platen opposite the printing point and are disposed between the printing point and the main ribbon 24 so that when the printing instrumentalities are actuated, the types will cooperate with the platen through three ribbons. Further it will be clear from this figure that the ribbons and the work sheets are interleaved or arranged in alternation with respect to the printing point. The innermost work sheet 66 lies next to the platen and contiguous to the outer face of the work sheet 66 is the auxiliary ribbon 119. Outside the ribbon 119 is the work sheet 65; then comes the auxiliary ribbon 118, and between the latter and the main ribbon 24 is arranged the other work sheet 64. The type impressions will be made on the outer face of the sheet 64 from the ribbon 24 while the type impressions on the outer faces of the inner sheets 65 and 66 will be made respectively from the ribbons 118 and 119.

It is preferred that the platen shall not be rocked back and forth frequently for the purpose of exposing the printing point, as such rocking would tend to disarrange the printing portion of the auxiliary ribbons and disturb their relationship with the work sheets. Accordingly we provide a locking device which is clearly shown in Figs. 1 and 4. Said device is in the form of a lever 149 pivoted between its ends at 150 to the left-hand end bar 7 of the carriage truck. The forward arm of the lever is formed with a notch or slot 151 which engages the platen axle 13 so that normally the platen frame is locked to the truck and cannot be moved with respect thereto. The lever 149 may, if preferred, be maintained in normal position by the spring or otherwise. The rear arm of the lever is provided with a finger piece 152 which enables the lever to be turned on its pivot and disengaged from the platen axle, enabling the platen frame to be rocked on the truck when desired.

Referring to Figs. 1 and 2, it will be noted that a finger 153 of wire or the like is secured to the left-hand brace 51 and projects inward in position to cooperate with the edge of the work sheet 65. The finger 153 serves as an indicating device or pointer as will be understood from what follows later on.

We have not considered it necessary to illustrate the printed blanks which are especially adapted to the present form of our invention. However, it may be stated that the outer sheet is perforated crosswise at three inch intervals, thus providing a roll of connected three inch blanks. These blanks are printed in columns with appropriate headings and other data comprised in the usual form of way-bill. Each one of these blanks is a way-bill and is adapted to receive a single line of writing, so that, as will be understood, the lines of writing on the outer work sheet are three inches apart. Both the inner sheets, however, are adapted to have the reproduced entries condensed, the lines of writing being a single line space unit apart. These inner sheets are each perforated at fourteen inch intervals and when detached may be entered as pages in record books. Each of the written way-bills, of course, is forwarded with the parcel or consignment to which it relates. It will be understood that while the two inner sheets are spaced by operating the regular line spacing handle 37, it is not practicable to so space the outer sheet owing to the different distances between the lines. Accordingly, after an item has been written on one of the way-bills, and has of course been simultaneously reproduced through the auxiliary ribbons on the two inner work sheets, the line spacing handle is operated once, thereby spacing the two inner sheets and also feeding the two auxiliary ribbons; and then the finger wheel 101 of the receiving roll for the sheet 64 is turned to wind said sheet thereon to an extent sufficient to bring the next succeeding way-bill into printing position. It will be clear that about three inches of the sheet 64 must be wound on the receiving roll after each line of writing has been completed. The front guide rod 60 serves as a convenient indicating device for the work sheet 64, the arrangement being such that when the printed headings at the top of one way-bill are advanced so that they immediately overlie said bar, then the next succeeding way-bill will be properly positioned relatively to the printing point. Furthermore, each of the fourteen inch lengths of the sheet 65 is provided with an indicating mark at such distance from the lower perforation of said fourteen inch length that when said indicating mark is brought opposite the pointer 153 the operator is advised that the bottom of said length is approaching the printing point. At the next line spacing operation, therefore, the sheets 65 and 66 should be advanced through several line space distances so as to skip the dividing perforation and enable the first line of the next succeeding fourteen inch length to be written at a suitable distance from the top margin thereof. It will be understood that each time the platen is turned after line spacing, the slack in the sheets 65 and 66 forward of the printing point will be taken up by the springs in the receiving roll holders. Furthermore it will be apparent that when the springs in the delivery roll holders have been wound up to the limit by the rotation of the roll holders relatively to their supporting shafts, thereafter as the paper is drawn off the delivery rolls and the roll holders are turned, their supporting shafts will turn along with them.

It will be noted that by our present invention we provide means for feeding a plurality of work sheets independently; that the control of certain of said work sheets is independent of the platen; that step-by-step feeding devices operative independently of the platen are employed for certain of said work sheets; that the outer sheet is guided in superposed relationship with the underlying sheets by devices including the rod 60; that there is employed in combination a platen, a plurality of feed rollers carrying rolls of paper, the printing portions whereof are in superposed relationship with each other, in combination with means for independently feeding paper from the different rolls; that means are provided coöperative with the platen for feeding paper from one roll, and separate means for feeding paper from another roll; that means are provided coöperative with the platen for simultaneously feeding paper from several of a plurality of roll holders, associated with other means for feeding paper from another of the roll holders; that means are provided coöperative with the platen for feeding paper from one roll, in combination with a receiving device for receiving the paper fed from another roll, and means for actuating said device to feed the paper thereon independently of the platen; that paper feeding means coöperate with a platen to feed paper when the platen is turned, combined with a paper receiving device, and means for feeding other paper from the platen on said device, said last recited means being operative independently of the platen; that a plurality of paper receiving devices are provided together with means coöperating with the platen for feeding paper to certain of said devices when the platen is turned, and means coöperating with another of said devices independently of the platen for feeding other paper to said other device; that a plurality of spring-controlled roll holders carrying rolls of paper are combined with means coöperative with the platen to turn one of said roll holders against its spring and draw the paper therefrom when the platen is turned, and means independent of the platen for turning another of said roll holders against its spring and drawing the paper from said other roll holder, the paper being drawn over the platen which remains motionless; that a set of spring mounted delivery roll holders is supported in rear of the platen combined with means controlled by the platen for feeding the paper from certain of said roll holders, and means at the front of the platen for drawing paper from certain other of said roll holders independently of the platen; that line spacing devices and a feed roller coöperate with a platen; that by actuating the line spacing devices, the feed roller and the platen are caused to draw line by line the paper from certain of the roll holders of a set of spring mounted roll holders, while a receiving roll holder is adapted to draw paper from another roll holder of said set, said receiving roll holder being combined with means for line spacing the same; that said receiving roll holder is rotatable by hand only, for feeding the paper; that the invention embodies a receiving roll holder, a shaft for said roll holder, a spring connected with said roll holder and with said shaft, and detent devices for maintaining said shaft in set position; that means are provided for turning a receiving roll holder step-by-step to line space the paper independently of the platen; that delivery and receiving roll holders are provided at opposite sides of the platen combined with means operating independently of the platen to maintain a receiving roll holder in set positions; that means independent of the platen are provided for feeding the paper off a delivery roll holder arranged at one side of the platen over the platen and on a receiving roll holder arranged at the opposite side of the platen; that a delivery roll holder and a receiving roll holder both independent of the main feed roller which coöperates with the platen are provided; that means are associated with the last named receiving roll holder for feeding paper thereon, said means operating independently of the platen; that the paper passing from certain of the delivery roll holders to certain of the receiving roll holders at opposite sides of the platen passes outside of the feed roller while certain other paper passes inside of said feed roller or between said feed roller and the platen; that the invention embodies a supporting frame on the carriage, said frame comprising side members of an inverted U-shape, the ends whereof are detachably secured to said carriage, and further comprises cross rods connecting said side members both at the front and rear; that two sets of roll holders each comprising a plurality of roll holders are mounted on the supporting frame one set above and back of the platen and the other set above the platen and in front of the first set; that the side members of said supporting frame are associated with braces at the front and rear, the braces being connected with said members by detachable blocks; and that the invention embodies in association with an understrike typewriting machine a supporting frame on the carriage thereof, said supporting frame carrying two sets of roll holders, one set at the rear of and above the platen and the other above the platen and in front of the first set, the work sheets passing down behind the platen from the delivery roll holders, thence over the printing point at the under side of the platen and then up at the front of the platen to the receiving roll holders.

Various changes may be made without departing from our invention.

What we claim as new and desire to secure by Letters Patent, is:—

1. In a typewriting machine, the combination of a platen, a plurality of roll holders carrying rolls of paper, the printing portions of which are in superposed relationship with each other, and means for independently feeding the paper from different rolls.

2. In a typewriting machine, the combination of a platen, a plurality of roll holders carrying rolls of paper, the printing portions of which are in superposed relationship with each other, means coöperative with the platen for feeding the paper from one roll, and separate means for feeding the paper from another roll.

3. In a typewriting machine, the combination of a platen, a plurality of roll holders carrying rolls of paper, the printing portions of which are in superposed relationship with each other, means coöperative with the platen for simultaneously feeding the paper from several of said plurality of rolls, and other means for feeding the paper from another of said rolls.

4. In a typewriting machine, the combination of a platen, a plurality of roll holders carrying rolls of paper, the printing portions of which are in superposed relationship with each other, means coöperative with the platen for feeding the paper from one roll, a receiving device for receiving the paper fed from another of said rolls, and means for actuating said device to feed the paper thereon independently of the platen.

5. In a typewriting machine, the combination of a platen, a plurality of paper receiving devices, means coöperating with the platen for feeding paper to certain of said devices when the platen is turned, means coöperating with another of said devices independently of the platen for feeding other paper to said other device, and means for guiding said other paper in superposed relationship with the paper first referred to.

6. In a typewriting machine, the combination of a platen, a plurality of spring controlled roll holders carrying rolls of paper, means coöperative with the platen to turn one of said roll holders against its spring and draw the paper therefrom when the platen is turned, and means independent of the platen for turning another of said roll holders against its spring and drawing the paper from said other roll holder.

7. In a typewriting machine, the combination of a platen, a plurality of roll holders carrying rolls of paper, the printing portions of which are in superposed relationship with each other, means coöperating with the platen for feeding the paper from one roll, and means independent of the platen for drawing the paper from another roll over said platen.

8. In a typewriting machine, the combination of a platen, a plurality of roll holders carrying rolls of paper, the printing portions of which are in superposed relationship, means coöperative with the platen for simultaneously feeding the paper from certain of said rolls, and means independent of the platen for drawing paper from another of said rolls around said platen while said platen is quiescent.

9. In a typewriting machine, the combination of a platen, a plurality of spring mounted roll holders carrying rolls of paper, means coöperative with the platen for controlling certain of said roll holders, and means independent of the platen for controlling certain other of said roll holders.

10. In a typewriting machine, the combination of a platen, a set of spring mounted delivery roll holders supported in rear of the platen, means controlled by the platen for feeding the paper from certain of said roll holders, and means at the front of the platen for drawing paper from certain other of said roll holders independently of the platen.

11. In a typewriting machine, the combination of a platen, line spacing devices therefor, a feed roller coöperative with said platen, a set of spring mounted roll holders, the paper from certain of said roll holders being controlled by said platen and said feed roller and being advanced from line to line by said line spacing means, a receiving roll holder for the paper from another of said set, which paper is fed independently of said feed roller, and means for line spacing said receiving roll holder.

12. In a typewriting machine, the combination of a platen, a set of spring mounted delivery roll holders, a plurality of spring mounted receiving roll holders for the paper from certain of said delivery roll holders, and a receiving roll holder, rotatable by hand only, for feeding the paper from another of said set.

13. In a typewriting machine, the combination of a platen, line spacing devices therefor, a set of spring mounted delivery roll holders, a plurality of spring mounted receiving roll holders for the paper from certain of said delivery roll holders, means coöperative with the platen for controlling the paper fed to said spring mounted receiving roll holders, and a receiving roll holder controlled independently of said platen line spacing devices for receiving the paper from another of said delivery roll holders.

14. In a typewriting machine, the combination of a platen, line spacing devices therefor, a set of spring mounted delivery roll holders, a plurality of spring mounted receiving roll holders, an additional receiving roll holder for the paper from one of said delivery roll holders, and step-by-step controlling devices independent of said line spacing devices for said additional receiving roll holder.

15. In a typewriting machine, the combination of a platen, a set of delivery roll holders, a plurality of spring mounted receiving roll holders, paper feeding means coöperative with the platen for controlling the paper received by said spring mounted roll holders, an additional receiving roll holder, and step-by-step feeding devices therefor operating independently of the platen.

16. In a typewriting machine, the combination of a platen, paper feeding devices coöperating therewith, a receiving roll holder, a shaft for said roll holder, a spring connected with said roll holder and with said shaft, and detent devices for maintaining said shaft in set positions, said spring tending constantly to draw the paper over the platen and on said roll holder.

17. In a typewriting machine, the combination of a platen, paper feeding devices coöperating therewith, a receiving roll holder, a shaft for said roll holder, a spring within said roll holder and connecting said shaft and said roll holder, said spring tending constantly to draw the paper from the platen and wind it on said roll holder, a toothed wheel on said shaft, and a detent coöperative with said wheel to maintain said shaft in set positions.

18. In a typewriting machine, the combination of a platen, line spacing devices therefor, a feed roller coöperative with the platen, a plurality of delivery roll holders, a plurality of receiving roll holders, the paper passing from certain of said delivery roll holders to the associate receiving roll holders coöperating with said platen and its feed roller while the paper delivered by certain other of said delivery roll holders is independent of said feed roller, and means associated with the receiving roll holder of said last named paper for feeding the same.

19. In a typewriting machine, the combination of a platen, line spacing devices therefor, a feed roller coöperating with the platen, delivery roll holders, receiving roll holders, the paper passing from certain of said delivery roll holders to the corresponding receiving roll holders between the platen and said feed roller, the paper connecting certain other of said roll holders passing outside said feed roller, and means independent of the platen for line spacing the paper last referred to.

20. In a typewriting machine, the combination with a platen, of a roll holder, a shaft on which said roll holder is mounted, a spring plunger engaging with one end of said shaft, the opposite end of said shaft being flattened, and a hand-controlled socket piece engaging with the flattened end of said shaft.

21. In a typewriting machine, the combination with a platen, of a roll holder, a shaft on which said roll holder is mounted, a spring plunger engaging with one end of said shaft, the opposite end of said shaft being flattened, a socket piece engaging the flattened end of said shaft, a second shaft to which said socket piece is secured, and means for turning said second shaft.

22. In a typewriting machine, the combination with a platen, of a roll holder, a shaft on which said roll holder is mounted, a spring plunger engaging with one end of said shaft, the opposite end of said shaft being flattened, a socket piece engaging the flattened end of said shaft, a second shaft to which said socket piece is secured, a finger wheel on said second shaft, a toothed wheel on said second shaft, and a detent coöperative with said toothed wheel.

23. In a typewriting machine, the combination with a platen, of a roll holder, a shaft for said roll holder, a supporting frame, a bearing block on said supporting frame, a spring plunger on said bearing block and engaging one end of said shaft, the opposite end of said shaft being flattened, a socket piece engaging the flattened end of said shaft, a second shaft with which said socket piece is connected, and a second bearing block on said supporting frame and providing a bearing for said second shaft.

24. In a typewriting machine, the combination of a platen; a carriage; and a roll holder supporting frame mounted thereon, said supporting frame comprising two side members of inverted U-shape each secured at its ends to the front and rear of said carriage, an angularly disposed brace associated with each side member, said braces being connected by blocks with said side members, and a side brace for each side member at the front, the lower end of each side brace being detachably connected to said carriage, the upper portion of each of said side braces paralleling the associate side member and being connected thereto by a plurality of detachable blocks.

25. In a typewriting machine, the combination of a platen, a platen carriage, a supporting frame mounted on said platen carriage and comprising substantially upright members, bearing blocks loosely pivoted on said supporting frame, means for preventing movement of said bearing blocks endwise of said supporting frame, a shaft mounted on said bearing blocks, a roll holder on said shaft, and a spring constantly pressing said shaft endwise in one direction, said shaft being movable endwise to disengage it from one of said bearing blocks to enable said shaft to be swung outside said frame on the other bearing block.

26. In a typewriting machine, the combination of a platen, a platen carriage, a supporting frame mounted on said platen carriage and comprising substantially upright members, bearing blocks loosely pivoted on said supporting frame, collars fixed to said upright members, one collar above and one below each of said bearing blocks, a shaft bearing in said blocks, a roll holder on said shaft, a spring tending constantly to press said shaft endwise in one direction, and a finger piece on said shaft.

27. In a typewriting machine, the combination of a platen, a carriage, a supporting frame thereon, roll holders on said supporting frame, and a pointer on said supporting frame coöperative with the paper connecting said roll holders, said pointer being stationary and remaining quiescent during turning movements of the platen.

28. In a typewriting machine, the combination of a platen, a carriage, a supporting frame thereon comprising side members, roll holders mounted at the front and rear of the platen on said supporting frame, and a plurality of cross rods on said supporting frame between said side members and serving to guide a plurality of the sheets which pass over the platen from one side to the other between said roll holders, one of said cross rods serving also as an indicating device.

29. In a typewriting machine, the combination of a platen carrier, a platen having an axle bearing on said carrier, and a mechanism for duplicating copies of typewritten matter, said mechanism including parts on said platen carrier and said mechanism comprising means for advancing a plurality of work sheets, a pair of auxiliary ribbon spools carrying auxiliary ribbons which are interleaved with certain of said work sheets, a spool shaft on said platen carrier, connections between said axle and said shaft comprising a gear on said axle, a gear on said shaft and an intermediate gear, clutch devices between said spools and said shaft, and hand controlled devices for controlling said clutch devices, said hand controlled devices comprising a slide rod frictionally mounted on said platen carrier, and forked arms connecting said slide rod with said clutch devices.

30. In a typewriting machine, the combination of a platen carrier, a platen thereon, and mechanism for duplicating copies of typewritten matter, said mechanism including parts on said platen carrier, and said mechanism comprising means for advancing a plurality of work sheets, auxiliary ribbon spools on said platen carrier and carrying a plurality of auxiliary ribbons which are interleaved with certain of said work sheets, a shaft on which said spools are mounted, said spools being provided with ratchets, sleeves slidable on said shaft and provided with teeth engaging with said ratchets, connections between said sleeves and said shaft whereby said sleeves are forced to turn with said shaft, connections between said shaft and said platen, forked arms engaging said sleeves, and a slide rod carrying said forked arms.

31. In a typewriting machine, the combination of a platen carrier, a platen thereon, and mechanism for duplicating copies of typewritten matter, said mechanism including parts on said platen carrier and said mechanism comprising means for advancing a plurality of work sheets, auxiliary ribbon spools on said platen carrier and carrying a plurality of auxiliary ribbons which are interleaved with certain of said work sheets, a shaft on which said spools are mounted, springs coöperating one with an end of each of said ribbon spools, ratchet teeth at the opposite ends of the ribbon spools, clutch devices connectible with said ratchet teeth, and hand controlled means coöperating with said clutch devices.

32. In a typewriting machine, the combination of a rotary platen, a plurality of superposed inking ribbons, paper feeding mechanism co-acting with said platen, line spacing mechanism therefor, means for superposing a plurality of sheets on the platen so that said sheets are interleaved with said ribbons whereby all of said sheets may be printed simultaneously, and means independent of the platen for feeding the outside sheet only past the printing point while the platen is stationary and said paper feeding mechanism is in co-active engagement with said platen.

Signed in the borough of Manhattan, city of New York, in the county of New York, and State of New York, this 22nd day of October, A. D. 1909.

ROBERT R. KING.
GEORGE T. PRICE.

Witnesses:
CHARLES E. SMITH,
J. B. DEWES.